3,544,325
PHOTOGRAPHIC ELEMENTS CONTAINING
STYRYL DYESTUFFS
Henri Depoorter, Mortsel, Theofiel Hubert Ghys, Kontich, and Marcel Jan Libeer, Mortsel, Belgium, assignors to Gevaert-Agfa N.V., Mortsel, Belgium, a Belgian company
Filed Sept. 8, 1967, Ser. No. 666,301
Claims priority, application Great Britain, Oct. 4, 1966, 44,275/66
Int. Cl. G03c 1/84
U.S. Cl. 96—84     2 Claims

ABSTRACT OF THE DISCLOSURE

A photographic silver halide light-sensitive material containing a dyestuff having the formula:

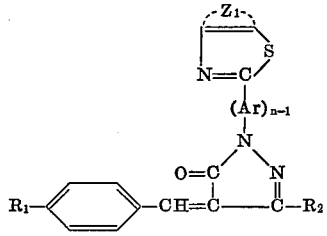

Figure 1:
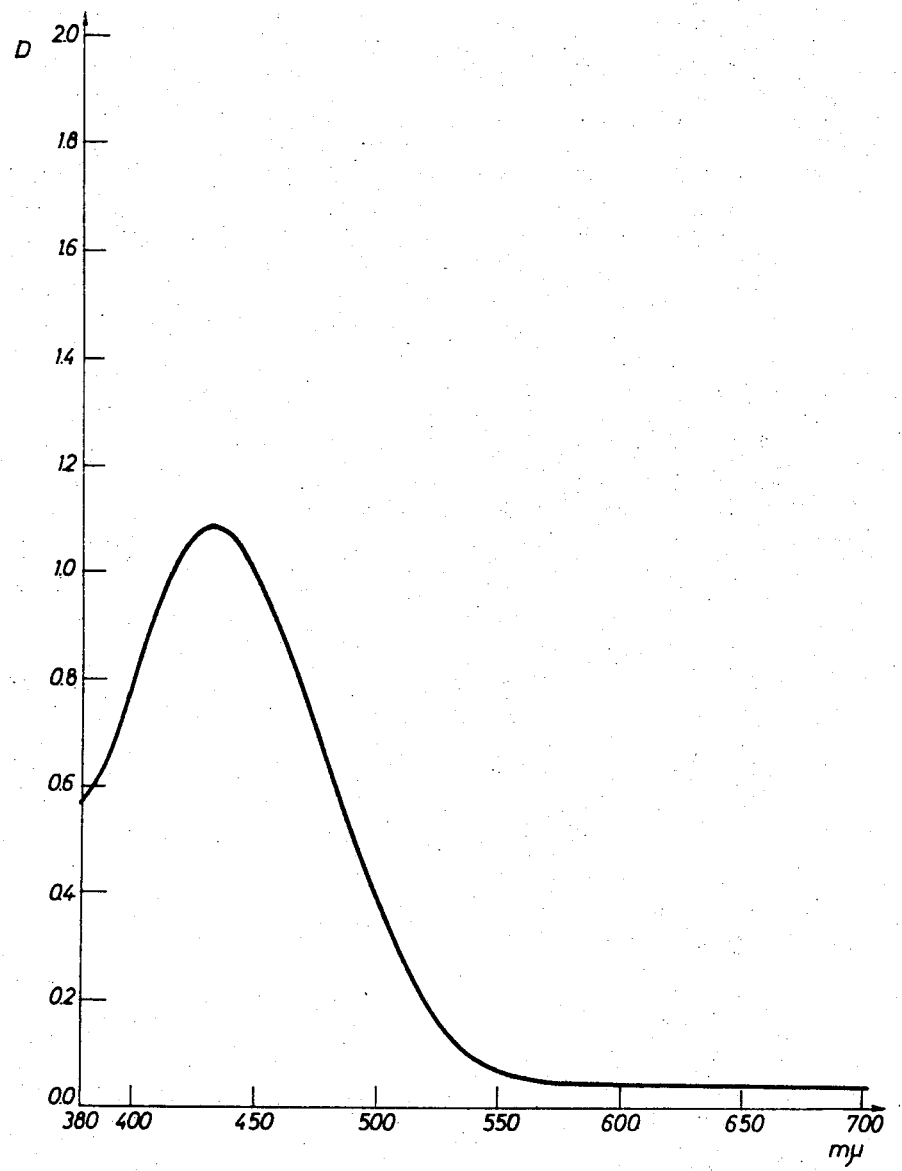

wherein:
$Z_1$ represents the atoms necessary to form a fused benzene nucleus,
Ar represents a phenylene group,
$n$ stands for 1 or 2,
$R_1$ represents hydroxy, an alkoxy group, or a dialkylamino group, and
$R_2$ represents an alkyl group, or an aryl group, at least one of the hydrogen atoms of the fused benzene nucleus or an aryl nucleus represented by $R_2$ being substituted by a sulphonic acid group in acid or salt form
is described. The photographic materials do not induce fog and have excellent spectral absorption characteristics for filter purposes and are very resistant to diffusion.

---

The invention relates to a new class of dyes, to the preparation thereof and to their use in photographic materials.

As is known, it is necessary to provide in common photographic colour material a filter layer which absorbs the blue light betwen the blue-sensitive silver halide emulsion layer and the green-sensitized silver halide emulsion layer. This filter layer must meet a whole series of requirements. Summarized, the filter layer should have a well-determined absorption range corresponding to the inherent sensitivity range of the underlaying emulsion layer(s), it should be stable and photographically inert in respect of adjacent layers, the dyes incorporated therein should be fast to diffusion and be easily discharged during processing. Up to now no product, composition or material is known which simultaneously and fully meets the above requirements.

A colloid layer comprising colloidal silver is almost generally used since with this kind of layer the above requirements are best met. However, such layer does not possess the desired absorption characteristics in full and the colloidal silver therein may give rise to fog in the adjacent silver halide emulsion layers. Further, as known to one skilled in the art, a filter layer containing colloidal silver may give rise to difficulties in negative sound track copying on a duplicating reversal colour material.

Organic dyes have been proposed as substitutes for colloidal silver. Many classes of dyes, however, were always, in at least one respect, inferior to colloidal silver particularly as to the discolouration in photographic baths, so that additional baths e.g. containing a reducing agent such as hydrazine are prescribed in order to still obtain an acceptable discolouration.

It is an object of the present invention to provide a new class of dyes, which are discharged as easily as colloidal silver in the usual processing baths, do not induce fog in the adjacent layers, have excellent spectral absorption characteristics for filter purposes and are very resistant to diffusion.

The dyes according to the present invention are represented by the following general Formula Ia:

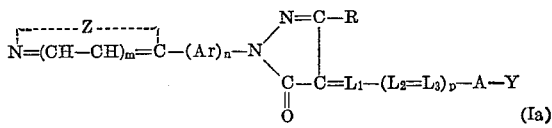

wherein
Z represents the atoms necessary to close a five or six membered heterocyclic ring including a substituted heterocyclic ring, the hetero atom(s) being selected from nitrogen, oxygen, sulphur and selenium atom(s), e.g. a nucleus of the thiazole or benzothiazole series, a nucleus of the naphthothiazole series e.g. naphtho[2,1-d] thiazole or naphtho[1,2-d]thiazole, a nucleus of the thionaphteno [7,6-d]thiazole, thiadiazole, oxazole or benzoxazole series, a nucleus of the naphthoxazole series e.g. naphtho[2,1-d] oxazole or naphtho[1,2-d]oxazole, a nucleus of the selenazole or benzoselenazole series, a nucleus of the naphthoselenazole series e.g. naphtho[2,1-d]selenazole, or naphtho[1,2-d]selenazole, a nucleus of the 2-quinoline, pyrimidine, quinoxaline, 1-phthalazine, 2-pyridine or benzimidazole series,
$m$ is 0 or 1,
Ar represents a bivalent aromatic radical including a substituted bivalent aromatic radical, e.g. a phenylene or naphthylene radical,
$n$ is 0, 1 or 2
R represents an alkyl radical including a substituted alkyl radical, an aralkyl radical including a substituted aralkyl radical, an aryl radical, including a substituted aryl radical e.g. a sulfa-substituted phenyl radical, a carboxyl group, an alkoxycarbonyl group or carbonamoyl group,
each of $L_1$, $L_2$ and $L_3$ represents a methine radical or a substituted methine radical,
$p$ is 0 or 1,
A represents an arylene radical including a substituted arylene radical or an arylene radical condensed to form a fused ring system preferably however, a phenylene radical or phenylene radical in substituted form e.g. substituted with an alkyl group, a substituted alkyl group, an aryl group, a substituted aryl group, an alkoxy group, a halogen atom, a nitro group, an alkoxycarbonyl group, a carboxy group, a cyano group, a sulpho group, an alkylsulphonyl group, a carbomoyl group, a carbonamido group, a sulphamoyl group, a sulphonamido group, a mercapto group, or an alkylthio group,
Y represents hydrogen, hydroxyl, alkoxy, amino, substituted amino, or alkylthio, and the dyestuff molecule contains at least one sulpho group in acid or salt form.

Compounds which are preferably used for the purpose of the present invention are represented by the following general Formula Ib:

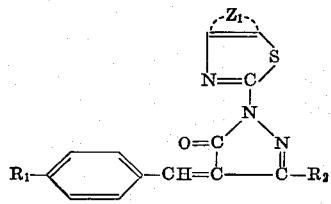
(Ib)

wherein:

$Z_1$ represents the atoms necessary to form a fused benzene nucleus including a substituted benzene nucleus e.g. a sulfo-substituted benzene nucleus, $R_1$ represents a hydroxy group, an alkoxy group or an amino group including a substituted amino group, preferably a bis($\beta$-cyanoethyl) substituted amino group, and $R_2$ represents an alkyl group including a substituted alkyl group, an aralkyl group including a substituted aralkyl group, an aryl group including a substituted aryl group e.g. a sulfo-substituted phenyl group, at least one of the hydrogen atoms of the fused benzene nucleus or an aryl nucleus represented by $R_2$ being substituted by a sulphonic acid group in acid or salt form.

The structural formulae of preferred dyes corresponding to the general Formulae Ia and Ib are listed in the following table.

Table

1 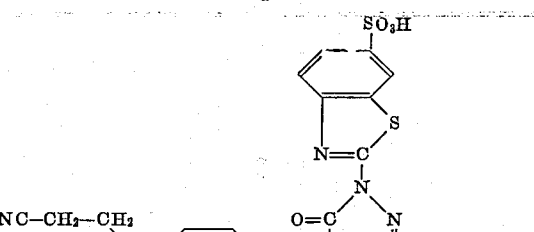

2 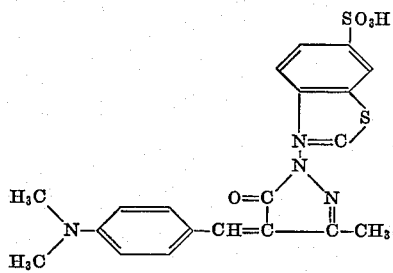

3 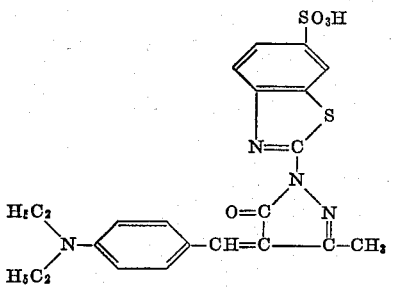

4 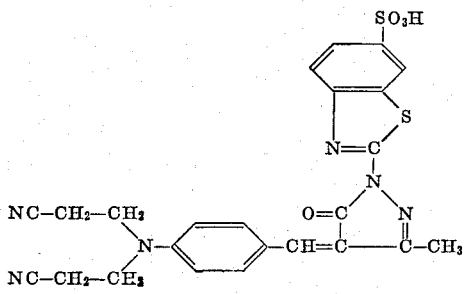

5 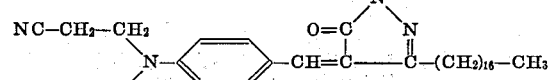

6 

7 

8 

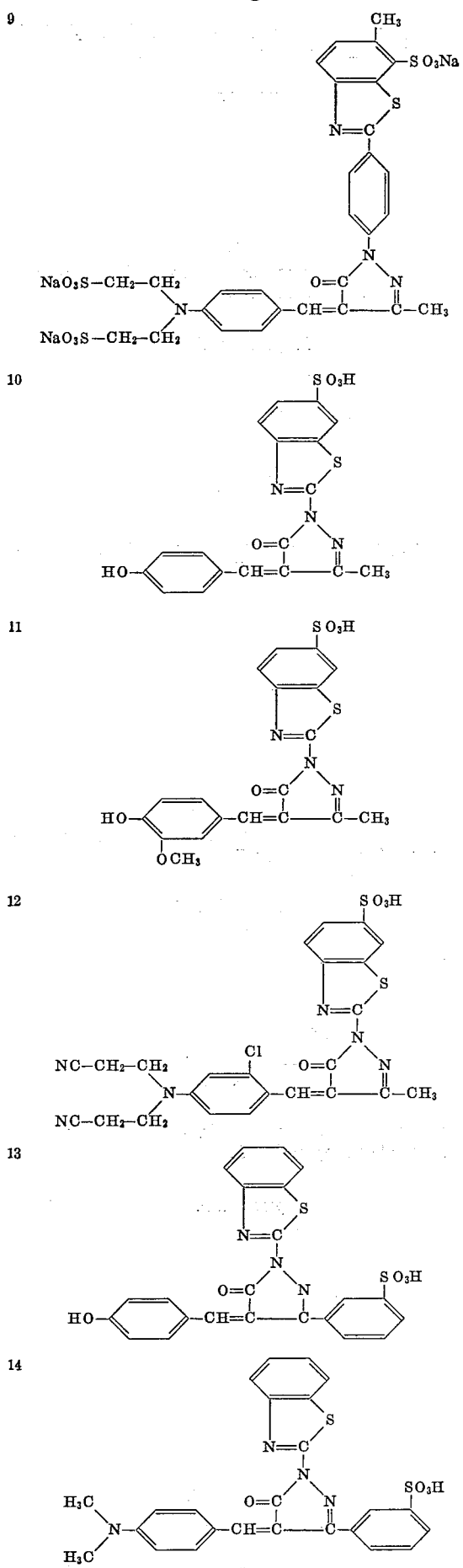

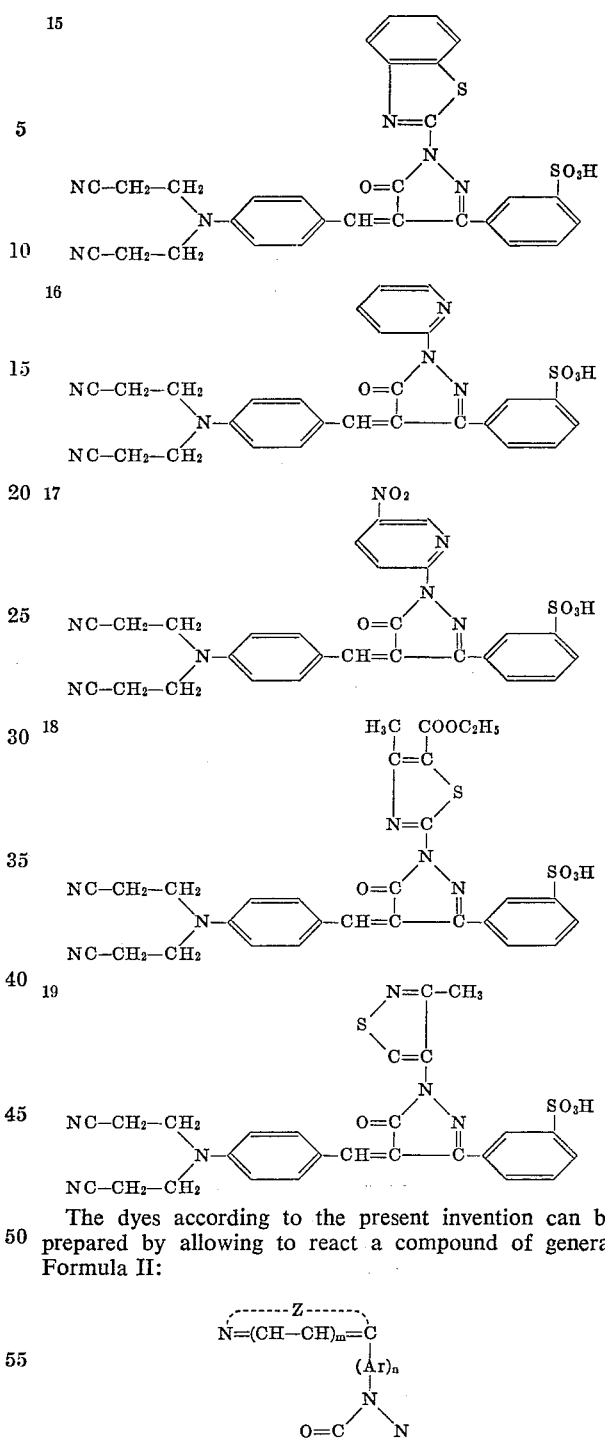

The dyes according to the present invention can be prepared by allowing to react a compound of general Formula II:

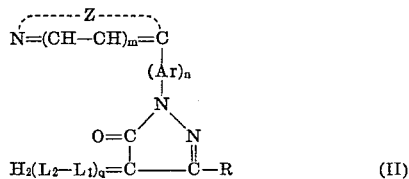

with a compound of general Formula III

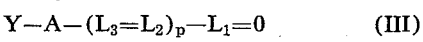

wherein Z, m, Ar, n, R, $L_1$, $L_2$, $L_3$, Y, A and p have the same values as in Formula Ia, and q is 0 or 1, but is 0 when p is 1.

The reaction can be carried out by heating a mixture of compounds II and III in the presence of a basic condensing agent such as sodium acetate or pyridine. The reaction can also be carried out in an inert diluent such as methanol, ethanol, acetonitrile, dimethylsulphoxide, tetrahydrothiophene-1,1-dioxide or dimethyl formamide, either or not in the presence of a basic condensing agent.

Particular intermediates of Formula II are commercially available products, such as 1-[4-(7-sulfo-6-methyl-2- benzothiazolyl)phenyl]-3-methyl-2-pyrazoline-5-one, sold by Farbwerke Hoechst (Hoechst-Frankfort O/M, W-Germany), or can be prepared by known methods starting from intermediates used in the dyestuff chemistry, such as 2-(p-aminophenyl)-7-sulpho-6-benzothiazole carboxylic acid, 2-[2-(p-aminophenyl)-6-benzothiazolyl]-6-methyl - 7 - benzothiazole sulphonic acid, 2 - (p - aminophenyl)-6-methyl-7-benzothiazole sulphonic acid, 2-(4-amino-3-sulphophenyl) - 6 - methyl-7-benzothiazole sulphonic acid (sold by Farberfabriken Bayer, Leverkusen, W-Germany under the denomination "Dehydro-p-toluidinedisulfonic acid").

The following further illustrates the preparation of intermediates of Formula II, however, without limiting the scope of this invention thereto.

Preparation A

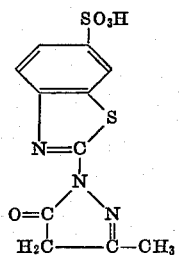

A mixture of 245 g. of 2-hydrazino-benzothiazole-6-sulphonic acid, 84 g. of sodium bicarbonate and 750 ccs. of water is treated with 160 ccs. of ethyl acetoacetate and heated for 4 h. on a waterbath while stirring. After filtering and cooling the solution is neutralised with 5 N hydrochloric acid. The precipitate formed is filtered, washed with 500 ccs. of warm water, isopropanol and ether. Yield: 208 g. (=67%). Melting point: above 260° C.

Preparation B

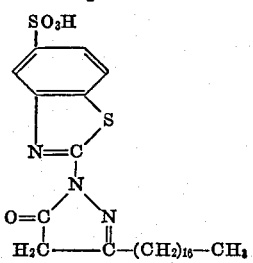

This compound was prepared in an analogous way as the compound of Preparation A.

Preparation C

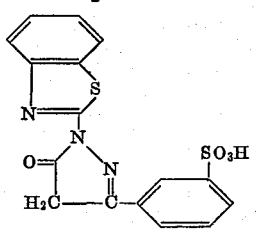

(a) A mixture of 99 g. of 2-hydrazido-benzothiazole and 172 g. methyl(3-fluorosulphonyl-benzoyl)acetate in 200 ml. of acetic acid is heated on a waterbath for 5 hours. After cooling, the precipitated 1(2-benzothiazolyl)-3-(3-fluorosulphonyl phenyl)-2-pyrazoline-5-one is collected and washed with a little of acetic acid and ether. Yield: 148 g. (66%). Melting point: 194°.

(b) The fluorosulphonyl derivative is converted to the sulphonic acid as follows: 148 g. of the pyrazoline-5-one compound described sub (a) is suspended in 200 ccs. of dioxane. A solution of 36 g. of sodium hydroxide in 300 ccs. of water is added portionwise with stirring. Stirring is continued for 3 hours at room temperature and with heating on a waterbath for a further hour. The sodium sulphonate so obtained is treated with 5 N hydrochloric acid, which yields 115 g. of 1-(2-benzothiazolyl)-3-(3-sulphophenyl) 2-pyrazoline-5-one, containing 10% of water.

Preparation D

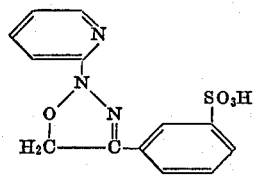

This compound was prepared in an analogous way as the compound of Preparation C.

Preparation E

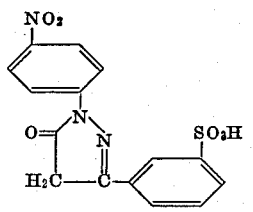

This compound was prepared in an analogous way as the compound of Preparation C.

Preparation F

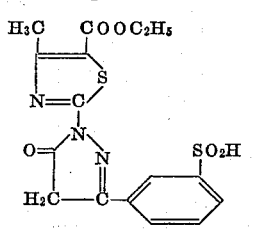

This compound was prepared in an analogous was as the compound of Preparation C.

Preparation G

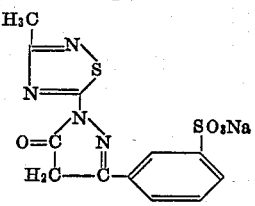

This compound was prepared in an analogous way as the compound of Preparation C.

Preparation H

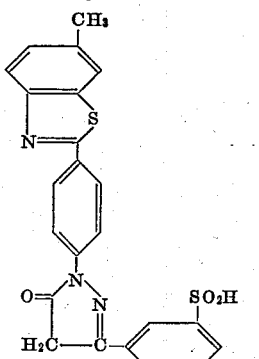

This compound was prepared in an analogous way as the compound of Preparation C.

Preparation I

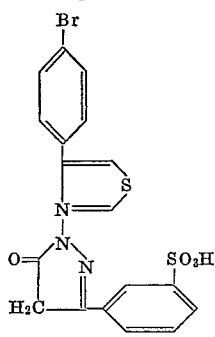

This compound was prepared in an analogous way as the compound of Preparation C.

The following illustrates the preparation of dyes according to the present invention.

Preparation 1

The dyestuff of Formula 1 of the above table is prepared as follows:

A mixture of 31.1 g. of 1-(6-sulpho-2-benzothiazolyl)-3-methyl-2-pyrazolin-5-one and 14.9 g. of p-dimethylaminobenzaldehyde in 500 ccs. of ethylene glycol monomethyl ether is heated for 3 h. on a waterbath under stirring. After cooling of the reaction mixture, the dye is collected and washed with 200 ccs. of warm ethylene glycol monomethyl ether, and ether. Yield: 41 g. (=90%). Absorption maximum in methanol with 1 mole NaOH 488 nm. ($\epsilon=5.63\times10^4$).

Preparation 2

The dyestuff of Formula 2 is prepared as follows:

A mixture of 9.3 g. of 1-(6-sulpho-2-benzothiazolyl)-3-methyl-2-pyrazolin-5-one and 5 g. of p-diethylaminobenzaldehyde in 100 ccs. of ethylene glycol monomethyl ether is refluxed for 3 h. The precipitate is filtered and recrystallized from dimethylformamide. Yield: 5.6 g. (=40%). Melting point: above 250° C. Absorption maximum in methanol: 495 nm. ($\epsilon=5.80\times10^4$).

Preparation 3

The dyestuff of Formula 3 is prepared as follows:

A solution of 9.33 g. of 1-(6-sulpho-2-benzothiazolyl)-3-methyl-2-pyrazolin-5-one and 6.81 g. of p-bis(2-cyanoethyl)-amino-benzaldehyde in 150 ccs. of dimethylformamide is heated on a waterbath for 1 h. and refluxed for 10 min. The precipitated dye is filtered and recrystallised from tetramethylene sulphone. Yield: 7.3 g. (=45%). Melting point: above 250° C. Absorption maximum in methanol: 460 nm. ($\epsilon=3.87\times10^4$).

Preparation 4

The dyestuff of Formula 4 is prepared as follows:

A solution of 5.35 g. of 1-(5-sulpho-2-benzothiazolyl)-3-heptadecyl-2-pyrazolin-5-one and 2.27 g. of p-bis(2-cyano-ethyl)amino-benzaldehyde in 125 ccs. of ethylene glycol monomethyl ether is refluxed for 30 min. The precipitate is filtered and washed with ether. Melting point: above 260° C. Yield: 5.7 g. (=75%). Absorption maximum in methanol: 463 nm. ($\epsilon=4.24\times10^4$).

Preparation 5

The dyestuff of Formula 5 is prepared as follows:

A solution of 10 g. of 1-[4-(7-sulpho-6-methyl-2-benzothiazolyl)phenyl] - 3 - methyl - 2 - pyrazolin-5-one (80%) and 2.5 g. of p-hydroxy-benzaldehyde in 40 ccs. of pyridine is refluxed for 15 min. After evaporation till dryness, the residue is treated with water and sodium chloride and recrystallized from absolute ethanol. Melting point: above 260° C. Yield: 4.6 g. (=45%). Absorption maximum in methanol: 375 nm. ($\epsilon=4.10\times10^4$).

Preparation 6

The dyestuff of Formula 6 is prepared in a similar way as that of Preparation 8. Absorption maximum in methanol: 468 nm. ($\epsilon=4.10\times10^4$).

Preparation 7

The dyestuff of Formula 7 is prepared as follows:

13.3 g. of 1-[4-(7-sulpho-6-methyl-2-benzothiazolyl)-phenyl]-3-methyl-2-pyrazolin-5-one (60%) are dissolved in 20 ccs. of dimethylformamide. Then 1.05 g. of sodium hydroxide in 1 cc. of water and 4 g. of p-diethylaminobenzaldehyde are added. The mixture is refluxed for 30 min. The dye is precipitated with ether, filtered and dried. Yield: 2.5 g. (=20%). Absorption maximum in methanol: 482 nm. ($\epsilon=5.00\times10^4$).

Preparation 8

The dyestuff of Formula 8 is prepared as follows:

A mixture of 10.0 g. of 1-[4-(7-sulpho-6-methyl-2-benzothiazolyl) - phenyl] - 3 - methyl-2-pyrazolin-5-one (80%), 4.6 g. of p-bis(2-cyanoethyl)-amino-benzaldehyde and 2.7 g. of sodium acetate is heated on an oil bath at 160° C. for 1 h. After cooling, the solid mass is pulverised and washed with acetone, and recrystallised from ethanol/water. Yield: 7.7 g. (=60%). Absorption maximum in methanol: 430 nm. ($\epsilon=4.50\times10^4$).

Preparation 9

The dyestuff of Formula 9 is prepared as follows:

A mixture of 10.0 g. of 1-[4-(7-sulpho-6-methyl-2-benzothiazolyl) - phenyl]3 - methyl - 2 - pyrazolin-5-one (80%), 7.0 g. of p-bis(2-sulpho-ethyl)-amino-benzaldehyde and 8.2 g. of sodium acetate is heated on an oil bath at 160° C. for 1 h. After cooling, the solid mass is pulverised and washed with acetone. The dye is purified by recrystallisation from water/acetone. Yield: 7 g. (45%). Absorption maximum in methanol: 468 nm. ($\epsilon=4.10\times10^4$).

Preparation 10

The dyestuff of Formula 10 is prepared in a similar way as that of Preparation 2. Yield: 84%. Abs. maximum in dimethylformamide: 492 nm. $\epsilon=7.2\times10^4$.

Preparation 11

The dyestuff of Formula 11 is prepared in a similar way as that of Preparation 2. Yield: 75%. Absorption maximum in dimethylformamide: 500 nm. $\epsilon=7.0\times10^4$.

Preparation 12

The dyestuff of Formula 12 is prepared in a similar way as that of Preparation 4. Yield: 68%. Absorption maximum in dimethylformamide: 460 nm. $\epsilon=3.1\times10^4$.

Preparation 13

The dyestuff of Formula 13 is prepared in a similar way as that of Preparation 1. Yield: 28%. Absorption maximum in dimethylformamide: 490 nm. $\epsilon=5.7\times10^4$.

Preparation 14

The dyestuff of Formula 14 is prepared in a similar way as that of Preparation 1. Yield: 86%. Absorption maximum in dimethylformamide: 497 nm. $\epsilon=5.0\times10^4$.

Preparation 15

The dyestuff of Formula 15 is prepared in a similar way as that of Preparation 1. Yield: 69%. Absorption maximum in dimethylformamide: 474 nm. $\epsilon=3.6\times10^4$.

Preparation 16

The dyestuff of Formula 16 is prepared as follows: a mixture of 6.0 g. of 1-(2-pyridyl)-3-(3-sulprophenyl)-2-pyrazolin - 5 - one and 3.0 g. of p-bis(2-cyanoethyl)-aminobenzaldehyde in 40 ccs. of acetic acid is heated for 3 h. on a waterbath. After cooling, the precipitate is collected and washed with acetic acid, water, ethanol and ether. Yield: 6.3 g. (70%). Absorption maximum in methanol: 456 nm. $\epsilon = 2.9 \times 10^4$.

Preparation 17

The dyestuff of Formula 17 is prepared in a similar way as that of Preparation 16. Yield: 48%. Absorption maximum in dimethylformamide: 472 nm. $\epsilon = 3.1 \times 10^4$.

Preparation 18

The dyestuff of Formula 18 is prepared in a similar way as that of Preparation 1. Yield: 52%. Absorption maximum in dimethylformamide: 470 nm. $\epsilon = 4.0 \times 10^4$.

Preparation 19

The dyestuff of Formula 19 is prepared in a similar way as that of Preparation 16. Yield: 29%. Absorption maximum in water: 492 nm. $\epsilon = 4.1 \times 10^4$.

Although, as said above, the dyestuffs according to the invention are excellently suitable for use in a filter layer between the blue-sensitive layer and the green-sensitized layer of a photographic colour material it is evident that they can also be applied in any photographic material based on light-sensitive silver halide where easily dischargeable, non-migratory dyestuffs are desired or necessary. Examples of other applications of these dyes are: in an antihalation layer between the support and a light-sensitive silver halide emulsion layer, in a filter layer between two light-sensitive silver halide emulsion layers or as screening dye in a light-sensitive layer.

The dyes according to the present invention can be incorporated into a photographic material according to techniques known by those skilled in the art for incorporating e.g. colour couplers and optical sensitizers.

The deystuffs is for instance dissolved in an appropriate solvent (in most cases this solvent can be water) and then added to a gelatin solution. To this solution can also be added appropriate coating aids and hardening agents. The solution thus obtained can then be applied as a layer according to known processes.

In the following table are listed the amounts of the dyes described above which have to be used in a layer to obtain an optical density equal to 1.0, measured at the $\lambda_{max}$ observed for the dyestuff in question.

| Dyestuff of formula: | Mg. dyestuff sq. m. | $\lambda_{max}$ (nm.) |
| --- | --- | --- |
| 1 | 220 | 475 |
| 2 | 135 | 480 (510) |
| 3 | 190 | 470 |
| 4 | 300 | 485 |
| 5 | 200 | 380 |
| 6 | 210 | 420–460 |
| 7 | 220 | 390 (480) |
| 8 | 200 | 435 |
| 9 | 240 | 465 |
| 10 | 200 | 492 |
| 11 | 220 | 500 |
| 12 | 250 | 475 |
| 13 | 260 | 480 |
| 14 | 300 | 505–445 |
| 15 | 260 | 500 |
| 16 | 200 | 490 |
| 17 | 240 | 472 |
| 18 | 280 | 470 |
| 19 | 200 | 480 |

In comparison with known filter dyes and antihalation dyes the dyestuffs according to the present invention are particularly characterized by the fact that in said dyestuffs a good fastness to diffusion is combined with a rapid and complete discolouring or discharging in photographic processing baths.

The following examples illustrate more specifically the preparation of filter layers according to the present invention.

EXAMPLE

A coating solution of the following composition is prepared:

| | Grams |
| --- | --- |
| Dyestuff 8 | 3.65 |
| Chrome alum | 0.33 |
| Sodium 2-methyl-7-ethyl-undecane sulphate | 0.6 |
| sulphate | 0.6 |
| Inert gelatin | 16.6 |
| Distilled water up to 1000 g. (pH 5.8). | |

This solution is coated on a subbed cellulose triacetate support pro rata of 60 g./sq. m., so that 1 g. of gelatin and 220 mg. of dyestuff are present per sq. m.

The absorption characteristics of the layer obtained are represented in FIG. 1.

EXAMPLE 2

A coating solution is prepared as follows:

| | Grams |
| --- | --- |
| Dyestuff 3 | 4 | is dissolved in a mixture of

| | |
| --- | --- |
| N-methylpyrrolidone/water (1/1) | 80 | and admixed with

| | |
| --- | --- |
| Inert gelatin | 24 |
| Sodium N-oleyl-N-methyl-amino-ethyl sulphonate | 1 |
| Distilled water | 800 |

After stirring the weight is brought to 1000 g. (pH 5.95).

The solution is coated on a subbed cellulose triacetate support pro rata of 62.5 g./sq. m. so that 1.5 g. of gelatin and 250 mg. of dyestuff are present per 1 sq. m.

Figure 2:
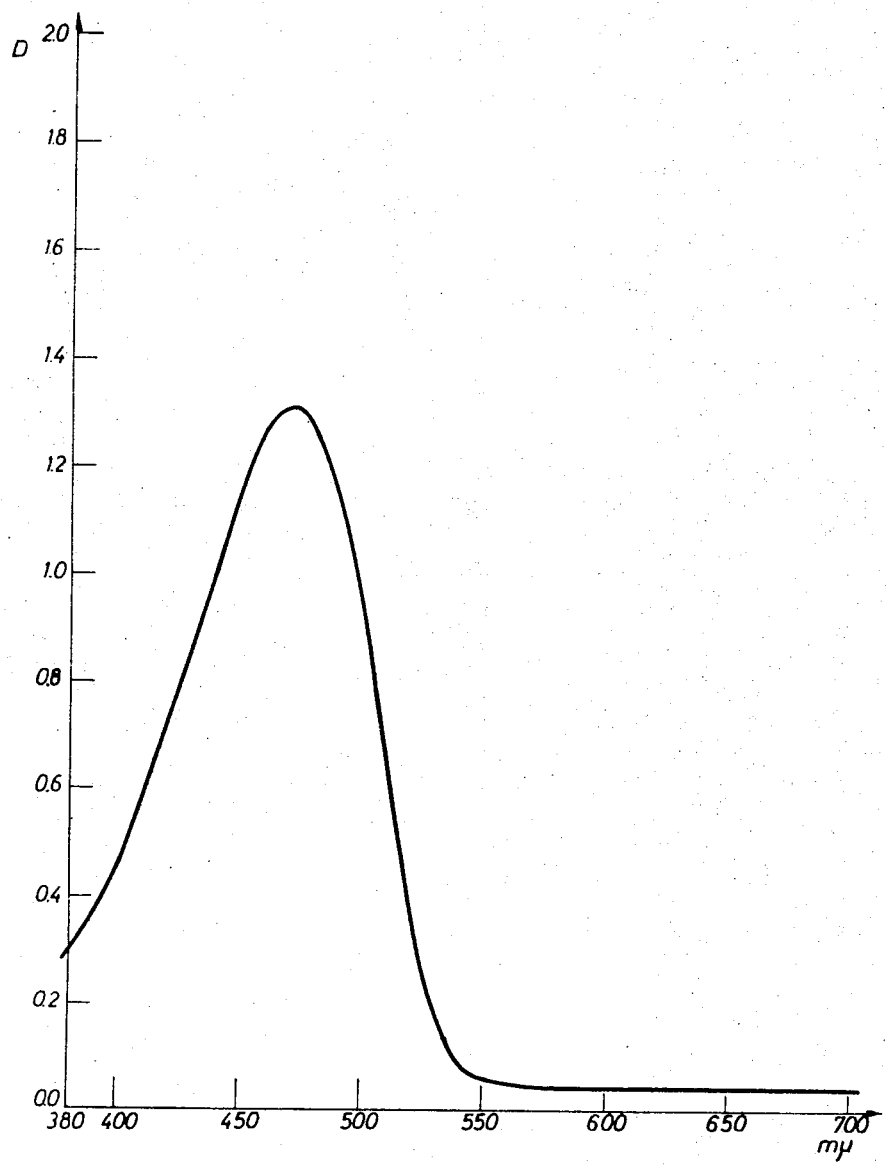

The absorption characteristics of the layer obtained are represented in FIG. 2.

The solutions as decribed in Example 1 and in Example 2 can be used for providing in a conventional way, a yellow filter-layer between the green-sensitized silver halide emulsion layer and the blue-sensitive layer of a photographic multilayer colour material.

With the above used concentrations the green- and red-sensitized layers are sufficiently shielded against light corresponding to the inherent sensitivity of said layers.

It is also possible, for application in certain materials, to use a mixture of both dyestuffs 3 and 8.

EXAMPLE 3

A coating solution of the following composition, intended for providing anti-halation undercoats, is prepared as follows:

| | Grams |
| --- | --- |
| Dyestuff 2 | 1.93 |
| Saponine | 0.6 |
| Formaldehyde 4% | 0.75 |
| Inert gelatin | 30 |

The pH of the solution is adjusted to pH 6.0.

This solution is applied to a subbed polyethylene terephthalate support pro rata of 70 g./sq. m., so that 2.1 g. of gelatin and 175 mg. of dyestuff are present per 1 sq. m.

Figure 3:
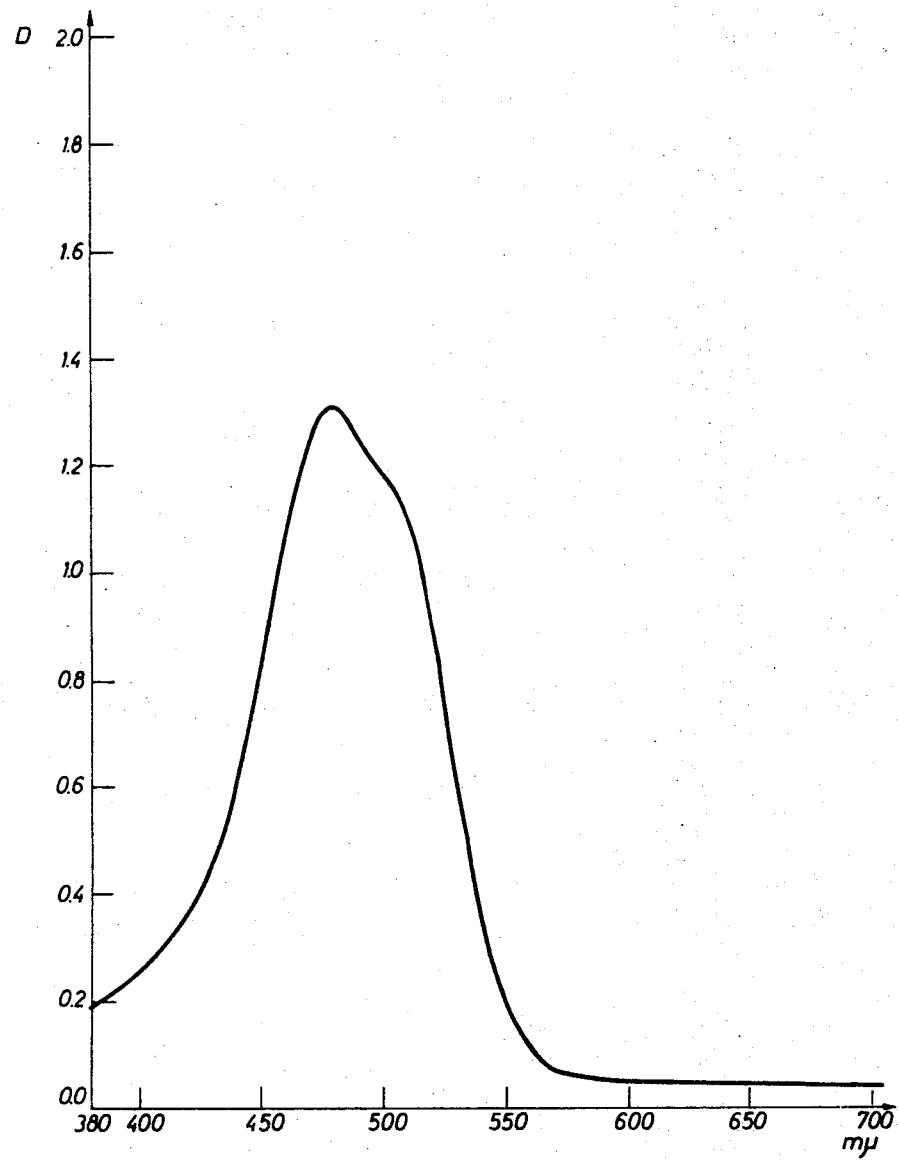

The spectral absorption characteristics of the layer obtained are represented in FIG. 3.

EXAMPLE 4

Figure 4:
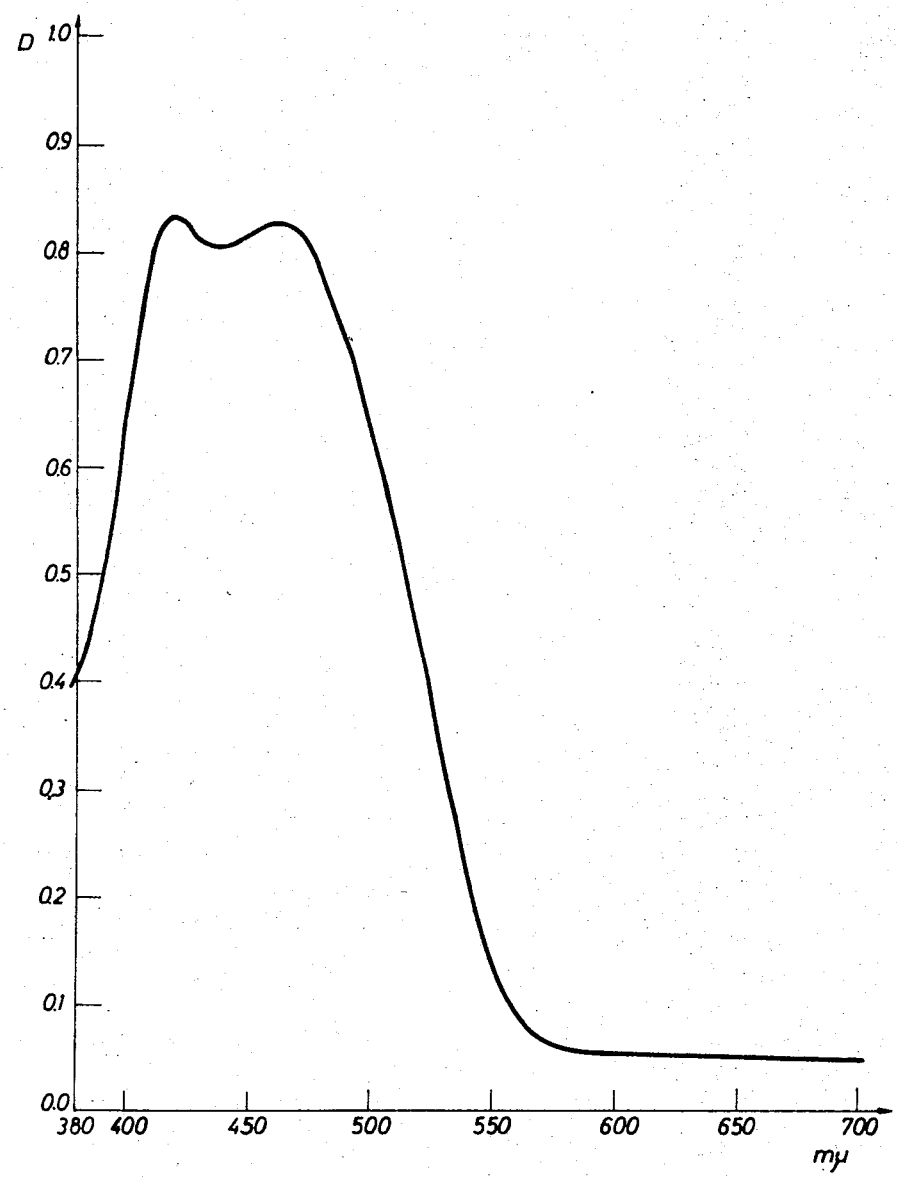

A coating solution is prepared as described in Example 3, but with dyestuff 6 instead of dyestuff 2 and coated in the same way on a subbed polyethylene terephthalate support. The spectral absorption characteristics are given in FIG. 4.

EXAMPLE 5

Analogously to Examples 3 and 4, a coating solution is prepared but with dyestuff 5.

Figure 5:
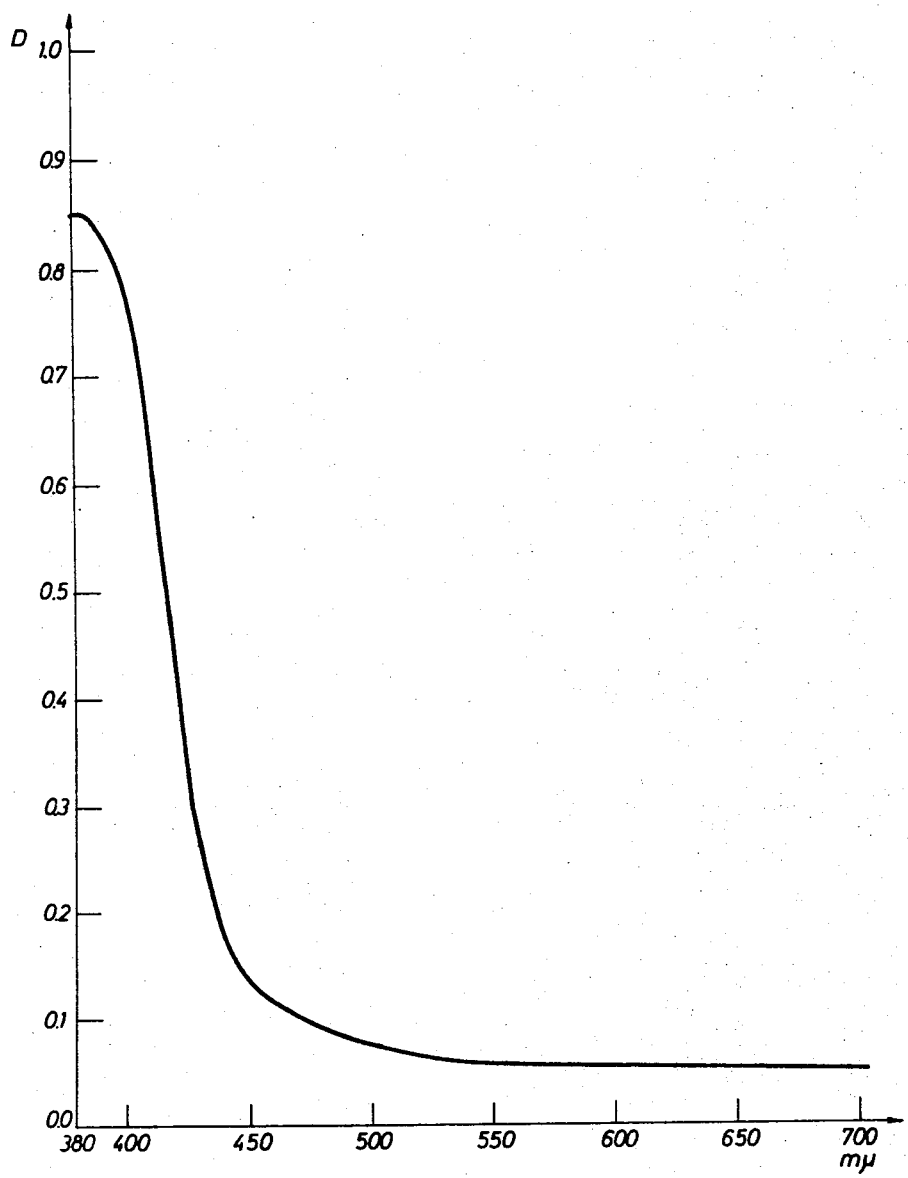

The spectral absorption characteristics are given in FIG. 5.

If antihalation undercoats with a higher absorption power for the near U.V. light are desired, combinations of dyestuff 5 with any other dyestuff of the present application are possible.

Afterwards, a non-sensitized silver halide emulsion layer may be applied to the above antihalation layers. The coloured undercoat assures an excellent antihalation action in respect of the emulsion applied without adversely affecting the sensitivity of the emulsion. The antihalation layer discolours completely after a treatment in the classical developing and fixing baths.

What we claim is:

1. A photographic silver halide light-sensitive material containing a styryl dyestuff having the formula:

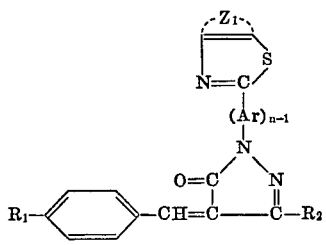

wherein:

$Z_1$ represents the atoms necessary to form a fused benzene nucleus,

Ar represents a phenylene group, $n$ stands for 1 or 2, $R_1$ represents hydroxy, an alkoxy group, or a dialkylamino group, and $R_2$ represents an alkyl group or an aryl group, at least one of the hydrogen atoms of the fused benzene nucleus or an aryl nucleus represented by $R_2$ being substituted by a sulphonic acid group in acid or salt form.

2. A photographic silver halide light-sensitive material containing a styryl dyestuff corresponds to the formula:

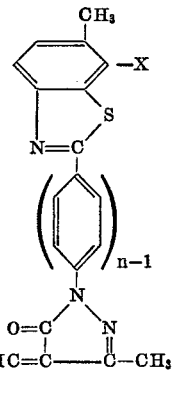

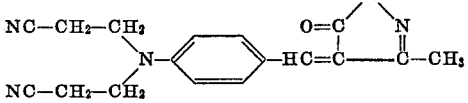

wherein:

X is a sulfo group in acid or salt form, and $n$ stands for 1 or 2, and is present in a filter layer, an anti-halation layer or silver halide emulsion layer.

References Cited

UNITED STATES PATENTS 3,389,994  6/1968  Piller _____ 96—84

RONALD H. SMITH, Primary Examiner

U.S. Cl. X.R.

260—240.9; 252—300